(12) United States Patent
Joulin et al.

(10) Patent No.: US 11,046,116 B2
(45) Date of Patent: *Jun. 29, 2021

(54) TREAD FOR AN AIRCRAFT TIRE

(71) Applicant: COMPAGNIE GENERALE DES ETABLISSEMENTS MICHELIN, Clermont-Ferrand (FR)

(72) Inventors: Emmanuel Joulin, Clermont-Ferrand (FR); José-Carlos Araujo Da Silva, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 343 days.

This patent is subject to a terminal disclaimer.

(21) Appl. No.: 15/776,439

(22) PCT Filed: Nov. 18, 2016

(86) PCT No.: PCT/FR2016/053010
§ 371 (c)(1),
(2) Date: May 16, 2018

(87) PCT Pub. No.: WO2017/085422
PCT Pub. Date: May 26, 2017

(65) Prior Publication Data
US 2018/0326788 A1 Nov. 15, 2018

(30) Foreign Application Priority Data

Nov. 19, 2015 (FR) ..................... 15/61130

(51) Int. Cl.
*B60C 11/00* (2006.01)
*C08L 23/16* (2006.01)
(Continued)

(52) U.S. Cl.
CPC ........ *B60C 11/0058* (2013.01); *B60C 1/0016* (2013.01); *B60C 9/18* (2013.01);
(Continued)

(58) Field of Classification Search
CPC combination set(s) only.
See application file for complete search history.

(56) References Cited

U.S. PATENT DOCUMENTS 4,366,527 A     12/1982  Bell
4,463,120 A  *  7/1984   Collins ............... C08J 5/127
                                                524/274
(Continued)

FOREIGN PATENT DOCUMENTS

CN      104411515       3/2015
DE       3012148       10/1980
(Continued)

OTHER PUBLICATIONS

The Journal of the American Chemical Society, vol. 60, pp. 309, Feb. 1938.
(Continued)

*Primary Examiner* — Nicole M. Buie-Hatcher
(74) *Attorney, Agent, or Firm* — Cozen O'Connor

(57)  ABSTRACT

Airplane tire tread (2), having an axial width L, comprises a middle part (3) having an axial width $L_C$ between 50% and 80% of L and composed of a middle rubber composition, and two lateral parts (41, 42), positioned axially on either side of middle part (3), each having an axial width ($L_{S1}$, $L_{S2}$) between 10% and 25% of L and each composed of a lateral rubber composition. The middle rubber composition comprises at least 50 phr of a first middle part diene elastomer ("FMPDE"), at most 70 phr of a middle part reinforcing filler ("MPRF") and a crosslinking system. FMPDE is a terpolymer of ethylene, of an α-olefin and of a non-conju- (Continued)

gated diene. The FLPDE lateral rubber composition of each lateral part comprises at least 50 phr of a first lateral part diene elastomer, a lateral part reinforcing filler content at least equal to the MPRF and a crosslinking system. The FLPDE is a terpolymer of ethylene, of an α-olefin and of a non-conjugated diene.

21 Claims, 2 Drawing Sheets

(51) Int. Cl.
  *B60C 1/00* (2006.01)
  *C08K 3/04* (2006.01)
  *C08L 7/00* (2006.01)
  *B60C 9/18* (2006.01)
  *C08K 3/06* (2006.01)
  *C08K 3/22* (2006.01)
  *C08K 3/36* (2006.01)

(52) U.S. Cl.
  CPC .................. *C08K 3/04* (2013.01); *C08K 3/06* (2013.01); *C08K 3/22* (2013.01); *C08K 3/36* (2013.01); *C08L 7/00* (2013.01); *C08L 23/16* (2013.01); *B60C 2001/0066* (2013.01); *B60C 2011/0016* (2013.01); *B60C 2200/02* (2013.01); *C08K 2003/2296* (2013.01)

(56) References Cited

U.S. PATENT DOCUMENTS

| | | | |
|---|---|---|---|
| 4,801,641 A * | 1/1989 | Ogawa | B60C 1/0016 524/426 |
| 6,540,858 B1 * | 4/2003 | Caretta | B60C 11/00 156/110.1 |
| 7,547,654 B2 | 6/2009 | Boisson et al. | |
| 8,071,800 B2 | 12/2011 | Thuilliez et al. | |
| 9,919,565 B2 * | 3/2018 | Bourgeois | B60C 11/04 |
| 10,189,978 B2 | 1/2019 | Thuilliez et al. | |
| 10,414,132 B2 | 9/2019 | Araujo Da Silva et al. | |
| 2001/0047840 A1 | 12/2001 | Nanni et al. | |
| 2003/0079816 A1 | 5/2003 | Mizuno | |
| 2004/0072934 A1 | 4/2004 | O'Rourke et al. | |
| 2004/0112490 A1 * | 6/2004 | Sandstrom | B60C 11/0058 152/152.1 |
| 2004/0127616 A1 | 7/2004 | Wentworth et al. | |
| 2005/0194076 A1 | 9/2005 | Vermaat et al. | |
| 2007/0017617 A1 | 1/2007 | Lafrique et al. | |
| 2007/0137748 A1 | 6/2007 | Itai | |
| 2011/0146861 A1 | 6/2011 | Nanni et al. | |
| 2011/0214788 A1 | 9/2011 | Chambriard et al. | |
| 2011/0226401 A1 | 9/2011 | Battocchio et al. | |
| 2011/0265923 A1 | 11/2011 | Arnold et al. | |
| 2012/0252929 A1 | 10/2012 | Yang | |
| 2012/0298271 A1 * | 11/2012 | Bijaoui | B60C 11/005 152/209.25 |
| 2014/0083589 A1 | 3/2014 | Abad et al. | |
| 2014/0194576 A1 | 7/2014 | Jin et al. | |
| 2014/0326387 A1 | 11/2014 | Estenne et al. | |
| 2014/0343216 A1 | 11/2014 | Custodero et al. | |
| 2015/0136287 A1 | 5/2015 | Bondu, Jr. et al. | |
| 2015/0353716 A1 | 12/2015 | Thuilliez et al. | |
| 2017/0204260 A1 | 7/2017 | Araujo Da Silva et al. | |
| 2017/0326844 A1 * | 11/2017 | Araujo Da Silva | B60C 1/00 |
| 2018/0326788 A1 | 11/2018 | Joulin et al. | |
| 2018/0326790 A1 | 11/2018 | Joulin et al. | |
| 2018/0370289 A1 | 12/2018 | Joulin et al. | |
| 2019/0061425 A1 | 2/2019 | Broemmel et al. | |

FOREIGN PATENT DOCUMENTS

| | | |
|---|---|---|
| EP | 0 864 447 | 9/1998 |
| EP | 1 092 731 | 4/2001 |
| EP | 1 163 120 | 12/2001 |
| EP | 1 381 525 | 1/2004 |
| EP | 1 477 333 | 11/2004 |
| EP | 1 554 321 | 7/2005 |
| EP | 1 656 400 | 5/2006 |
| EP | 1 800 905 | 6/2007 |
| EP | 1 829 901 | 9/2007 |
| EP | 1 954 705 | 8/2008 |
| EP | 1 957 506 | 8/2008 |
| EP | 2 310 213 | 4/2011 |
| EP | 2 733 172 | 5/2014 |
| FR | 1462227 | 7/1965 |
| FR | 1461754 | 11/1965 |
| FR | 1461755 | 11/1965 |
| FR | 2 952 855 | 5/2011 |
| FR | 2 983 121 | 5/2013 |
| FR | 3 012 148 | 4/2015 |
| WO | WO 2004/009693 | 1/2004 |
| WO | WO 2010/000747 | 1/2010 |
| WO | WO 2011/078859 | 6/2011 |
| WO | WO 2014/114607 | 7/2014 |
| WO | WO-2016091571 A1 * | 6/2016 ........... B60C 1/0016 |

OTHER PUBLICATIONS

S.K. Clark, "Touchdown dynamics", Precision Measurement Company, Ann Arbor, MI, NASA, Langley Research Center, Computational Modeling of Tires, pp. 9-19, Aug. 1995.

* cited by examiner

TREAD FOR AN AIRCRAFT TIRE

RELATED APPLICATIONS

This is a U.S. National Phase Application under 35 USC 371 of International Application PCT/FR2016/053010 filed on Nov. 18, 2016.

This application claims the priority of French application no. 1561130 filed Nov. 19, 2015, the entire content of which is hereby incorporated by reference.

FIELD OF THE INVENTION

The subject of the present invention is an aeroplane tire and, in particular, the tread of an aeroplane tire.

BACKGROUND OF THE INVENTION

An aeroplane tire is characterized by use at high pressure, load and speed. By way of example, an aeroplane tire of dimension 46×17R20, intended to be fitted to a commercial aeroplane, may be used at a pressure equal to 15.3 bar, a static load equal to 21 tonnes and a maximum speed equal to 360 km/h. Generally, an aeroplane tire is used at a pressure of greater than 9 bar and a degree of deflection at least equal to 32%. The use pressure is defined, for example, by the Tire and Rim Association (TRA) standard. The degree of deflection of a tire is, by definition, its radial deformation, or its variation in radial height, when the tire changes from an unladen inflated state to a statically loaded inflated state, under pressure and load conditions recommended, for example, by the TRA standard. It is expressed in the form of a relative deflection, defined by the ratio of this variation in radial height of the tire to half the difference between the outside diameter of the tire and the maximum diameter of the rim measured on the rim flange. The outside diameter of the tire is measured under static conditions in an unladen state inflated to the recommended pressure.

Since a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The expressions "radially", "axially" and "circumferentially" mean "in the radial direction", "in the axial direction" and "in the circumferential direction", respectively.

The tread is the part of the tire intended to come into contact with the ground via a tread surface, and extending radially from a bottom surface to the tread surface, axially from a first tread edge to a second tread edge defining the axial width of the tread, and circumferentially over the whole periphery of the tire. Conventionally, the axial width of the tread is defined as the width of the patch of contact between the tread and the ground, measured along the axial straight line passing through the centre of the contact patch, when the new tire is subject to the loading and pressure conditions recommended by the TRA standard. The tread is generally composed of raised elements separated by voids. In the case of an aeroplane tire, the raised elements are usually circumferential ribs, continuous over the whole circumference of the tire, and separated by circumferential voids or grooves. The tread, which is the wearing part of the tire, comprises at least one rubber composition, usually based on natural rubber and on carbon black, these two main elements affording the rubber composition the mechanical properties necessary for the wear conditions of an aeroplane tire. In addition to these main elements, such a rubber composition conventionally comprises a vulcanization system and protective agents.

Radially inside the tread, a radial-type tire comprises a reinforcement, consisting of a crown reinforcement and a radial carcass reinforcement radially inside the crown reinforcement. The crown reinforcement comprises at least one crown layer composed of reinforcing elements or reinforcers coated with an elastomeric mixture and parallel to one another. The radial carcass reinforcement comprises at least one carcass layer composed of reinforcers coated with an elastomeric mixture, parallel to one another and oriented substantially radially, that is to say forming, with the circumferential direction, an angle of between 85° and 95°. The reinforcers of the crown and carcass layers, for aeroplane tires, are usually textile reinforcers made of aliphatic polyamide such as nylon, made of aromatic polyamide such as aramid, or made of hybrid material combining, for example, an aliphatic polyamide and an aromatic polyamide.

In aeroplane tires, the presence of non-uniform wear to the tread, known as irregular wear, has been observed, resulting from the stresses that occur during the various life phases of the tire: take-off, taxiing and landing. Differential wear to the tread between a middle part and the two lateral parts of the tread, axially on the outside of the middle part, has more particularly been demonstrated, with the wear to this middle part being greater. The differential wear to the middle part of the tread leads to a limiting of the service life of the tire, and therefore to a limiting of its use and to the premature removal thereof, despite the fact that the tread generally only has a relatively small degree of wear to the lateral parts of the tread: this is economically unsound.

Those skilled in the art have demonstrated two types of wear, depending on the life phase of the tire. On landing, the middle part of the tread, having an axial width at least equal to 50% and at most equal to 80% of the total axial width of the tread, and coming into contact with the ground, is subject to wear referred to as "touch wear", resulting from significant thermal heating at the moment at which the tread surface enters into contact with the ground, due to the speed differential between the speed of rotation of the tire and the speed of the aeroplane. In the taxiing phase, before take-off or after landing, the lateral parts of the tread, positioned axially on either side of the middle part and each having an axial width at least equal to 10% and at most equal to 25% of the total axial width of the tread, are subject to wear referred to as "taxiing wear", resulting from the braking forces exerted on these lateral parts due to their speed of rotation, which is higher than that of the middle part. Thus, the tread is mainly worn in its middle part on landing and in its lateral parts on taxiing.

In order to solve the problem of irregular wear specific to aeroplane tires, those skilled in the art sought, according to a first approach, to optimize the inflated meridian profile of the tread surface, this meridian profile being the meridian cross section through the tread surface of an unladen new tire inflated to its nominal pressure, without taking into account circumferential grooves. Optimizing this inflated meridian profile, i.e. the geometric form thereof, makes it possible to optimize the geometric form of the contact surface of the tire with the ground and, consequently, the distribution of the mechanical stresses within this contact surface and hence to act on the wear of the tread. For example, documents EP 1163120, EP 1381525, EP 1477333 and EP 2310213 describe solutions aiming to optimize the inflated profile of the tread surface by acting on the tensile stiffnesses of the crown and/or carcass layers, or on the tensile stiffness differentials between the middle part and the lateral parts of the crown layers, or else on an optimized crown layer profile with a concave middle part. All these solutions are based on changes in the material and/or geometry of the crown layers.

Another approach to the wear of an aeroplane tire is optimizing the rubber composition(s) composing the tread. Indeed, wear also depends on the rubber composition(s) composing the tread and on their sensitivity to abrasion, characterized in particular by their cohesion, since cohesion depends on the chemical composition.

SUMMARY OF THE INVENTION

One object of the present invention, in relation to an aeroplane tire of the prior art, is to increase the resistance to touch wear of the middle part of the tread during landing phases, while guaranteeing at least the same level of resistance to taxiing wear of the lateral parts of the tread during taxiing phases, by acting on the rubber compositions of the various parts of the tread.

This object has been achieved, according to one aspect of the invention, by an aeroplane tire comprising a tread having an axial width L, the tread comprising:

a middle part having an axial width $L_C$ at least equal to 50% and at most equal to 80% of the axial width L of the tread and composed of a middle rubber composition, and two lateral parts positioned axially on either side of the middle part, each having an axial width at least equal to 10% and at most equal to 25% of the axial width L of the tread and each composed of a lateral rubber composition, the middle rubber composition comprising at least 50 phr of a first middle part diene elastomer, at most 70 phr of a middle part reinforcing filler and a crosslinking system, which first middle part diene elastomer is a terpolymer of ethylene, of an α-olefin and of a non-conjugated diene, and the lateral rubber composition of each lateral part comprising at least 50 phr of a first lateral part diene elastomer, a lateral part reinforcing filler content greater than the middle part reinforcing filler content and a crosslinking system, which first lateral part diene elastomer is a terpolymer of ethylene, of an α-olefin and of a non-conjugated diene.

It should be noted that the lateral parts of the tread may have different axial widths and/or have different lateral rubber compositions, even though, preferably, the axial widths of the lateral parts are identical and though their lateral rubber compositions are also identical.

A content by weight or content of a first diene elastomer at least equal to 50 phr (50 parts per hundred parts of elastomer) means that this first diene elastomer is the predominant elastomer in the rubber composition. The content of first diene elastomer is therefore predominant in the middle rubber composition and in each lateral rubber composition, but this content may differ from one rubber composition to another.

For the middle part, the content of predominant first middle part diene elastomer is combined with a middle part reinforcing filler content at most equal to 70 phr. This affords the middle rubber composition better resistance to touch wear of the middle part of the tread.

For each lateral part, the content of predominant first lateral part diene elastomer is combined with a lateral part reinforcing filler content greater than the middle part reinforcing filler content. This affords each lateral rubber composition good resistance to taxiing wear of each lateral part of the tread.

Thus, the differentiation of the content of reinforcing filler between the middle part and the lateral parts, each consisting of a rubber composition with a content of first diene elastomer according to the invention that is predominant, makes it possible to guarantee a satisfactory compromise between the touch wear resistance of the middle part and the taxiing wear resistance of the lateral parts.

Preferentially, the middle rubber composition comprises at least 60 phr of a first middle part diene elastomer.

Further preferentially, at least one lateral rubber composition comprises at least 60 phr of a first lateral part diene elastomer.

The α-olefin used for the synthesis of the terpolymer (or of the first diene elastomer) of the middle or lateral rubber composition may be a mixture of α-olefins. The α-olefin generally comprises from 3 to 16 carbon atoms. Suitable as α-olefin are, for example, propylene, 1-butene, 1-pentene, 1-hexene, 1-octene and 1-dodecene.

Advantageously, for at least one of the first middle part and respectively lateral part diene elastomers, the α-olefin is propylene, in which case the terpolymer is commonly referred to as an EPDM (ethylene propylene diene monomer) rubber.

The non-conjugated diene used for the synthesis of the terpolymer (or of the first diene elastomer) of the middle or lateral rubber composition generally comprises 6 to 12 carbon atoms. Mention may be made, as example of non-conjugated diene, of dicyclopentadiene, 1,4-hexadiene, 5-ethylidene-2-norbornene, 5-methylene-2-norbornene or 1,5-cyclooctadiene.

Advantageously, for at least one of the first middle part and respectively lateral part diene elastomers, the non-conjugated diene is 5-ethylidene-2-norbornene or dicyclopentadiene.

According to one embodiment of the invention, at least one of the first middle part and respectively lateral part diene elastomers has at least one, and preferably all, of the following characteristics:

the ethylene units represent between 20 and 90%, preferentially between 30 and 70%, by weight of the first diene elastomer, the α-olefin units represent between 10 and 80%, preferentially from 15 to 70%, by weight of the first diene elastomer, the non-conjugated diene units represent between 0.5 and 20% by weight of the first diene elastomer.

It is understood that the first middle part or lateral part diene elastomer may be composed of a mixture of terpolymers of ethylene, of α-olefin and of non-conjugated diene which differ from one another in their macrostructure or their microstructure, in particular in the respective contents by weight of the ethylene, α-olefin and non-conjugated diene units.

According to a particular embodiment of the invention, at least one of the first middle part and respectively lateral part diene elastomers is the only elastomer of the respectively middle part and lateral part rubber composition.

According to another particular embodiment of the invention, at least one of the middle or lateral rubber compositions comprises a second middle part or lateral part elastomer, preferably a diene elastomer, that is to say an elastomer comprising diene monomer units. When the rubber composition comprises a second elastomer, it preferably comprises more than 50 phr, more preferentially more than 60 phr, of the first diene elastomer.

The second elastomer of the middle or lateral rubber composition may be an "essentially unsaturated" or "essentially saturated" diene elastomer. "Essentially unsaturated" is understood to mean generally a diene elastomer resulting at least in part from conjugated diene monomers having a content of subunits or units of diene origin (conjugated dienes) which is greater than 15% (mol %); thus, diene elastomers such as butyl rubbers or copolymers of dienes and of α-olefins of EPDM type do not fall under the preceding definition and may especially be described as "essentially saturated" diene elastomers (low or very low content, always less than 15%, of subunits of diene origin). In the category of "essentially unsaturated" diene elastomers, "highly unsaturated" diene elastomer is understood in particular to mean a diene elastomer having a content of subunits of diene origin (conjugated dienes) which is greater than 50%.

Preferably, the second middle part or lateral part elastomer is a highly unsaturated diene elastomer selected from the group consisting of polybutadienes, polyisoprenes, butadiene copolymers, isoprene copolymers and mixtures of these elastomers.

The polyisoprenes can be synthetic polyisoprenes (IR) or natural rubber (NR). It is understood that the second diene elastomer may be composed of a mixture of diene elastomers which differ from one another in their microstructure, in their macrostructure, in the presence of a function or in the nature or the position of the latter on the elastomer chain.

The reinforcing filler, known for its abilities to reinforce a rubber composition which can be used for the manufacture of tires, can be a carbon black, a reinforcing inorganic filler, such as silica, with which is combined, in a known way, a coupling agent, or else a mixture of these two types of filler. Such a reinforcing filler typically consists of nanoparticles, the (weight-)average size of which is less than a micrometre, generally less than 500 nm, most commonly between 20 and 200 nm, in particular and more preferentially between 20 and 150 nm.

Advantageously, the reinforcing filler of at least one of the middle or lateral rubber compositions comprises a carbon black.

The carbon black has a BET specific surface area preferably of at least 90 m$^2$/g, more preferentially of at least 100 m$^2$/g. The blacks conventionally used in tires or their treads ("tire-grade" blacks) are suitable for this purpose. Mention will more particularly be made, among the latter, of the reinforcing carbon blacks of the 100, 200 or 300 series (ASTM grade), such as, for example, the N115, N134, N234 or N375 blacks. The carbon blacks can be used in the isolated state, as available commercially, or in any other form, for example as support for some of the rubber additives used. The BET specific surface area of the carbon blacks is measured according to Standard D6556-10 [multipoint (at least 5 points) method—gas: nitrogen—relative pressure p/p0 range: 0.1 to 0.3].

According to a particular embodiment of the invention, the reinforcing filler of at least one of the middle or lateral rubber compositions comprises 100% by weight of a carbon black.

According to another embodiment of the invention, the reinforcing filler of at least one of the middle or lateral rubber compositions comprises an inorganic filler, preferably a silica.

The term "reinforcing inorganic filler" is intended to mean any inorganic or mineral filler, regardless of its colour and its origin (natural or synthetic), also referred to as "white" filler, "clear" filler or even "non-black" filler, in contrast to carbon black, capable of reinforcing, by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferentially silica ($SiO_2$), are especially suitable as reinforcing inorganic fillers. The silica used may be any reinforcing silica known to those skilled in the art, especially any precipitated or fumed silica exhibiting a BET surface area and a CTAB specific surface area both of less than 450 m$^2$/g, preferably from 30 to 400 m$^2$/g and especially between 60 and 300 m$^2$/g.

The physical state in which the reinforcing inorganic filler is provided is unimportant, whether it is in the form of a powder, microbeads, granules or else beads. Of course, the term "reinforcing inorganic filler" is also intended to mean mixtures of various reinforcing inorganic fillers, in particular of highly dispersible silicas as described above.

In the present account, as regards the silica, the BET specific surface area is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure p/po range: 0.05 to 0.17). The CTAB specific surface area is the external surface determined according to French Standard NF T 45-007 of November 1987 (method B).

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

Advantageously, the middle rubber composition comprises a content of middle part reinforcing filler at most equal to 50 phr.

Further advantageously, the middle rubber composition comprises a middle part reinforcing filler content at least equal to 20 phr, preferably at least equal to 25 phr.

In particular, a middle rubber composition comprising a diene elastomer, with a content of reinforcing filler preferentially at least equal to 25 phr and at most equal to 50 phr, makes it possible to improve the resistance to touch wear during landings, without degrading the resistance to taxiing wear during taxiing phases.

The crosslinking system of any middle or lateral rubber composition can be based either on sulfur or on sulfur donors and/or on peroxide and/or on bismaleimides. The crosslinking system is preferentially a vulcanization system, i.e. a system based on sulfur (or on a sulfur-donating agent) and on a primary vulcanization accelerator. To this base vulcanization system, various known secondary vulcanization accelerators or vulcanization activators are added, such as zinc oxide, stearic acid or equivalent compounds, or guanidine derivatives (in particular diphenylguanidine), or else known vulcanization retarders, which are incorporated during the first non-productive phase and/or during the productive phase, as described subsequently.

The sulfur is used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

Any middle or lateral rubber composition may also comprise all or a portion of the usual additives customarily used in elastomer compositions intended to constitute treads, such as, for example, plasticizers, pigments, protective agents, such as antiozone waxes, chemical antiozonants or antioxidants, or antifatigue agents.

Advantageously, at least one of the middle or lateral rubber compositions comprises 0 to 20 phr of a liquid plasticizer.

A plasticizer is regarded as being liquid when, at 23° C., it has the ability to ultimately assume the shape of its container, this definition being given in contrast to plasticizing resins, which are by nature solid at ambient temperature. Mention may be made, as liquid plasticizer, of vegetable oils, mineral oils, ether, ester, phosphate or sulfonate plasticizers, and their mixtures.

Preferentially, the content of liquid plasticizer of at least one of the middle or lateral rubber compositions is equal to 0.

Usually, the two lateral parts, positioned axially on either side of the middle part, have identical axial widths. Advantageously, the two lateral parts are composed of identical lateral rubber compositions. According to a preferred embodiment, the two lateral parts, positioned axially on either side of the middle part, have identical axial widths and are composed of identical lateral rubber compositions.

Since the tire comprises a crown reinforcement radially inside the tread, the tire advantageously comprises an interlayer composed of a rubber composition, in contact by a radially outer face with the entire width of the tread and by a radially inner face with the crown reinforcement. Contact of the radially outer face of the interlayer with the entire tread means that the axial width of this contact is substantially equal to the axial width L of the tread. Contact of the radially inner face of the interlayer with the crown reinforcement is contact with the protective reinforcement, which is the radially outermost part of the crown reinforcement, intended to protect the working reinforcement, which is the radially innermost part of the crown reinforcement. This interlayer, also referred to as connecting layer, guarantees better connection between the tread comprising a rubber composition according to the invention and the crown reinforcement.

According to a first embodiment, the interlayer is composed of a rubber composition comprising natural rubber. The rubber composition also comprises a reinforcing filler and a crosslinking system.

According to a second embodiment, the interlayer is composed of a rubber composition comprising an elastomer matrix, which elastomer matrix contains a terpolymeric elastomer of ethylene, of an α-olefin and of a non-conjugated diene and contains at least 10% by weight of diene units. "Elastomer matrix" is used to refer to all the elastomers contained in the rubber composition. The rubber composition also comprises a reinforcing filler and a crosslinking system. It is understood that the elastomer may be a mixture of terpolymers of ethylene, of α-olefin and of non-conjugated diene which differ from one another in their macrostructure or their microstructure, in particular by the respective contents by weight of the ethylene, α-olefin and non-conjugated diene units. A diene unit is a monomer unit originating from the insertion of a monomer subunit resulting from the polymerization of a conjugated diene monomer or of a non-conjugated diene monomer, the diene unit comprising a carbon-carbon double bond. The rubber composition of the interlayer, according to this second embodiment, may be used in its generic form, as described above, or in the form of any one of its embodiments, described in document FR 14/61754.

According to a third embodiment, the interlayer is composed of a rubber composition comprising an elastomer comprising ethylene units and diene units comprising a carbon-carbon double bond, which units are distributed randomly within the elastomer. The rubber composition also comprises a reinforcing filler and a crosslinking system. The rubber composition of the interlayer, according to this third embodiment, may be used in its generic form, as described above, or in the form of any one of its embodiments, described in document FR 14/61755.

According to a fourth embodiment, the interlayer is composed of an elastomeric laminate comprising, radially from the outside to the inside, n layers Ci, n being an integer greater than or equal to 2 and i being an integer ranging from 1 to n, each composed of a diene rubber composition, the layer C1 comprising a diene elastomer E comprising ethylene units and diene units, the diene units representing more than 10% by weight of the monomer units of the diene elastomer E, the layer Cn comprising from 50 to less than 100 phr of a diene elastomer N having a content by weight of diene units of greater than 50%, the content expressed in phr of diene elastomer N being higher in the layer Cn than in the layer C1, the content expressed in phr of diene elastomer E being higher in the layer C1 than in the layer Cn, the layers Ci, for the values of i ranging from 2 to n−1, where n is greater than 2, comprising a diene elastomer I selected from the group consisting of diene homopolymers and copolymers having more than 10% by weight of diene units. The rubber compositions also comprise a reinforcing filler and a crosslinking system. The rubber compositions of the interlayer, according to this fourth embodiment, may be used in their generic forms, as described above, or in the form of any one of their respective embodiments, described in document FR 14/62227.

Regarding the composition of the elastomers, the microstructure is generally determined by $^1$H NMR analysis, supplemented by $^{13}$C NMR analysis when the resolution of the $^1$H NMR spectra does not enable the attribution and quantification of all the species. The measurements are carried out using a Bruker 500 MHz NMR spectrometer at frequencies of 500.43 MHz for observing protons and 125.83 MHz for observing carbons. For the measurements of mixtures or elastomers which are insoluble but which have the ability to swell in a solvent, an HRMAS z-grad 4 mm probe is used, making it possible to observe protons and carbons in proton-decoupled mode. The spectra are acquired at spin speeds of 4000 Hz to 5000 Hz. For the measurements of soluble elastomers, a liquid NMR probe is used, making it possible to observe protons and carbons in proton-decoupled mode. The insoluble samples are prepared in rotors filled with the analyte and a deuterated solvent enabling swelling, in general deuterated chloroform (CDCl$_3$). The solvent used must always be deuterated and its chemical nature may be adapted by those skilled in the art. The amounts of material used are adjusted so as to obtain spectra with sufficient sensitivity and resolution. The soluble samples are dissolved in a deuterated solvent (approximately 25 mg of elastomer in 1 ml), in general deuterated chloroform (CDCl$_3$). The solvent or solvent blend used must always be deuterated and its chemical nature may be adapted by those skilled in the art. The sequences used for proton NMR and carbon NMR, respectively, are identical for a soluble sample and for a swelled sample. For the proton NMR, a simple 30° pulse sequence is used. The spectral window is adjusted to observe all the resonance lines belonging to the molecules analysed. The accumulation number is adjusted in order to obtain a signal to noise ratio that is sufficient for the quantification of each subunit. The recycle period between each pulse is adapted to obtain a quantitative measurement. For the carbon NMR, a simple 30° pulse sequence is used with proton decoupling only during acquisition to avoid the "nuclear Overhauser" effects (NOE) and to remain quantitative. The spectral window is adjusted to observe all the resonance lines belonging to the molecules analysed. The accumulation number is adjusted in order to obtain a signal to noise ratio that is sufficient for the quantification of each subunit. The recycle period between each pulse is adapted to obtain a quantitative measurement. The NMR measurements are carried out at 25° C.

BRIEF DESCRIPTION OF THE DRAWINGS

The characteristics of the invention will be better understood by means of FIGS. 1 and 2, and by means of the results of measurements and tests carried out on rubber compositions as used in a tire according to the invention.

FIG. 1, not shown to scale in order to facilitate the understanding thereof, presents a view in cross section in a meridian plane of the crown of an aeroplane tire according to the invention, comprising, radially from the outside to the inside, a tread 2, a crown reinforcement 5 and a carcass reinforcement 6. The tread 2, having an axial width L, comprises a middle part 3 having an axial width L$_C$ at least equal to 50% and at most equal to 80% of the axial width L of the tread and composed of a middle rubber composition, and two lateral parts (41, 42), positioned axially on either side of the middle part 3, each having an axial width (L$_{S1}$, L$_{S2}$) at least equal to 10% and at most equal to 25% of the axial width L of the tread and each composed of a lateral rubber composition.

FIG. 2 presents a view in cross section in a meridian plane of the crown of an aeroplane tire according to a particular embodiment of the invention, wherein the tire 1 also comprises an interlayer 7 composed of a rubber composition, in contact by a radially outer face with the tread 2 and by a radially inner face with the crown reinforcement 5.

Figure 1:
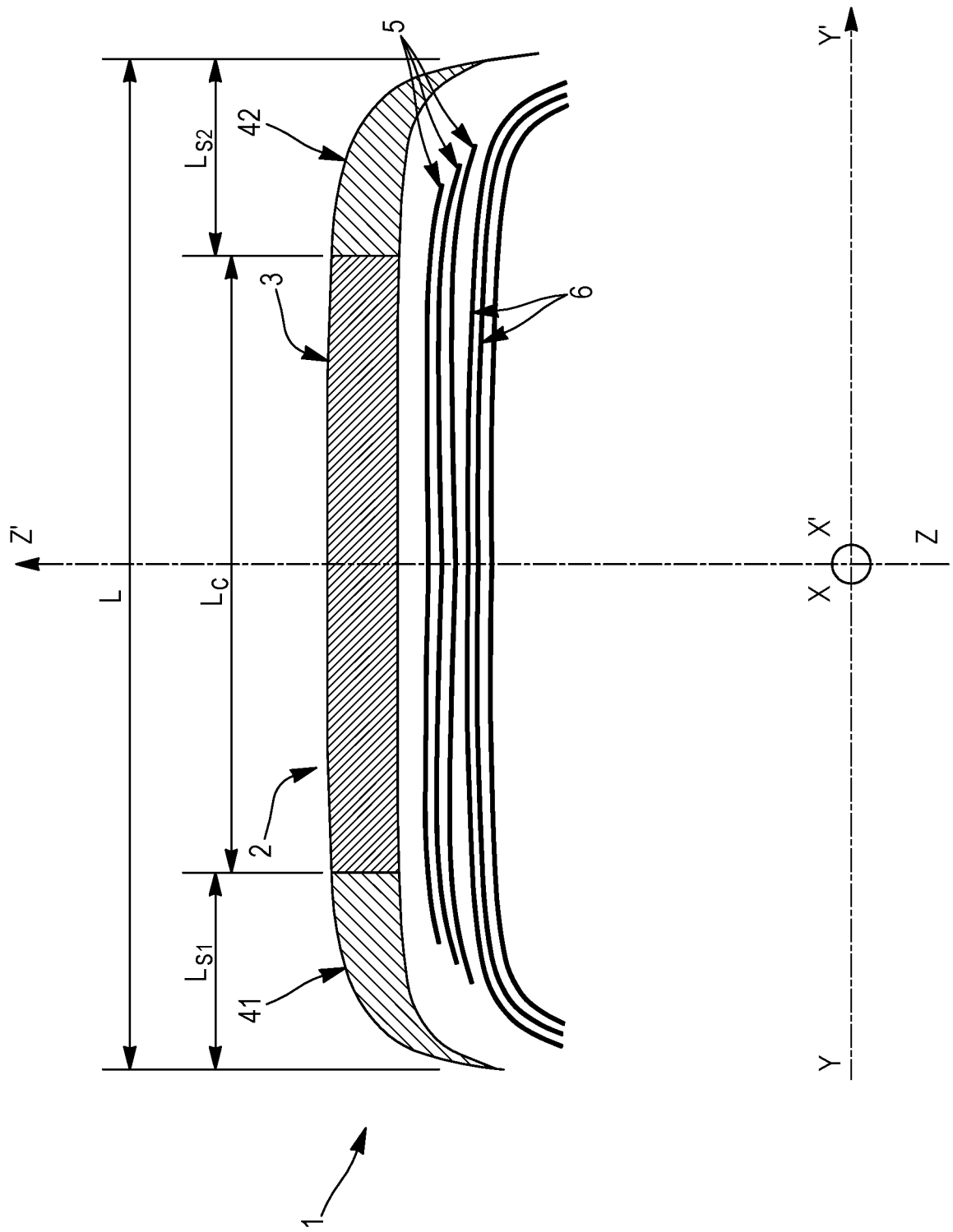
FIG. 1 shows a view in cross-section in a meridian plane of the crown of an airplane tire according to an embodiment of the invention.
Figure 2:
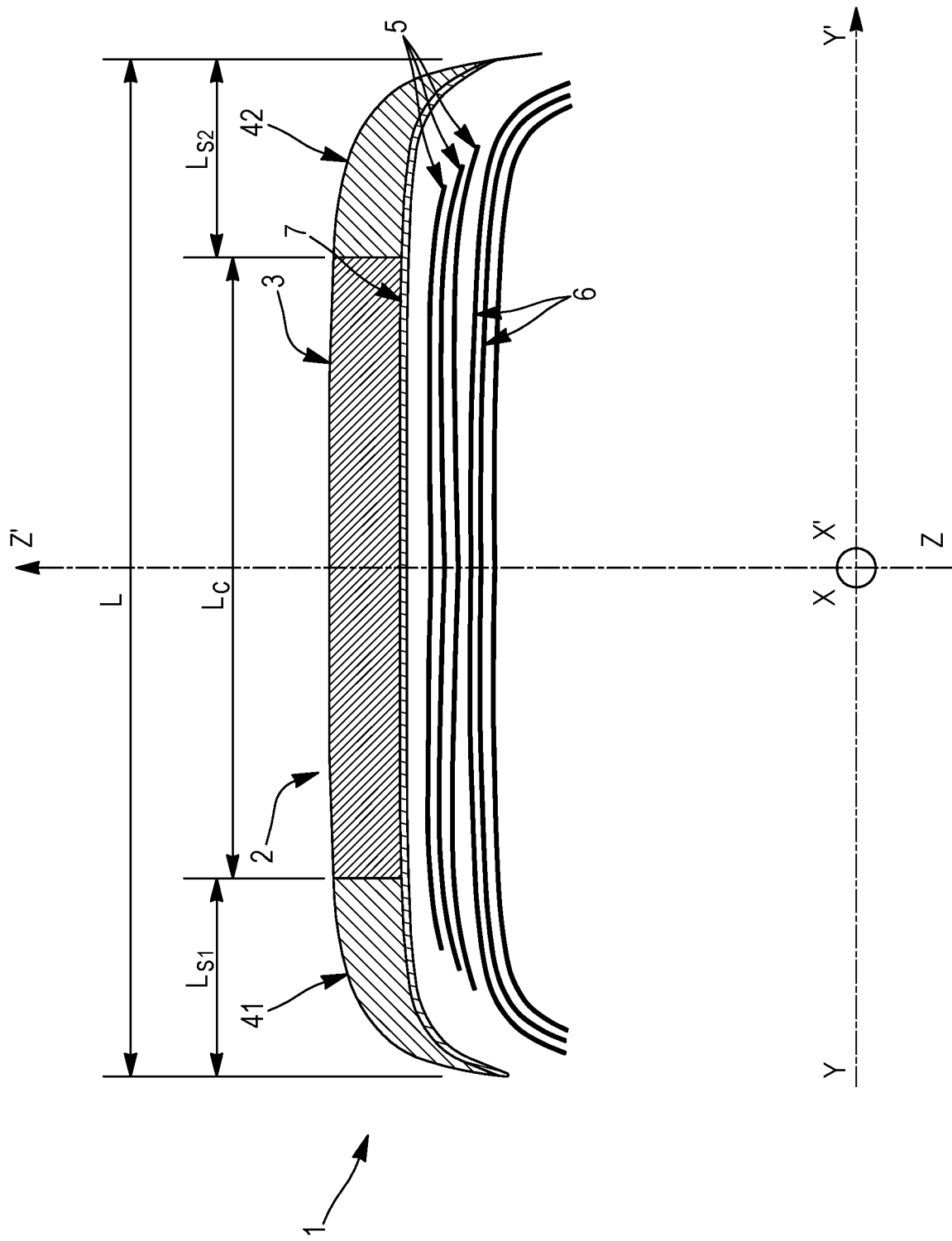
FIG. 2 shows a view in cross-section in a meridian plane of the crown of an airplane tire according to another embodiment of the invention.

The invention has more particularly been studied in the case of an aeroplane tire of dimension 46×17R20, intended to be fitted to the main landing gear of a commercial airliner. For such a tire, the inflation pressure is 15.3 bar, the static load is 21 tonnes and the maximum speed is 360 km/h.

Laboratory tests and measurements were carried out on different rubber compositions comprising a terpolymeric diene elastomer of ethylene, of an α-olefin and of a non-conjugated diene, in comparison with rubber compositions based on natural rubber which are generally used in aeroplane tire treads of the prior art.

The rubber compositions according to the invention and of the prior art were prepared according to the process described below. The diene elastomers, the reinforcing fillers and also the various other ingredients, with the exception of the vulcanization system, are successively introduced into an internal mixer (final degree of filling: approximately 70% by volume), the initial vessel temperature of which is approximately 80° C. Thermomechanical working (nonproductive phase) is then carried out in one step, which lasts in total approximately 3 to 4 min, until a maximum "dropping" temperature of 165° C. is reached. The mixture thus obtained is recovered and cooled and then sulfur and an accelerator of sulfamide type are incorporated on a mixer (homofinisher) at 70° C., everything being mixed (productive phase) for an appropriate time (for example approximately ten minutes). The compositions thus obtained are subsequently calendered, either in the form of slabs (thickness of 2 to 3 mm) or of thin sheets of rubber, for the measurement of their physical or mechanical properties, or extruded in the form of an aeroplane tire tread.

The wear resistance of the rubber compositions defined above was evaluated on samples, in particular by a high-speed abrasion test, representative of the landing conditions of an aeroplane tire, combined with a measurement of loss in weight and by a measurement of breaking strength.

Regarding the loss in weight, a sample of rubber composition is subjected to an abrasion test on a high-speed abrasion tester. The high-speed abrasion test is carried out according to the principle described in the paper by S. K. Clark, "*Touchdown dynamics*", Precision Measurement Company, Ann Arbor, Mich., NASA, Langley Research Center, *Computational Modeling of Tires*, pages 9-19, published in August 1995. The tread material rubs over a surface, such as a Norton Vulcan A30S-BF42 disc. The linear speed during contact is 70 m/s with a mean contact pressure of 15 to 20 bar. The device is designed to rub until exhausting of the energy from 10 to 20 MJ/m$^2$ of contact surface. The loss in weight performance is evaluated on the basis of the loss in weight according to the following formula: Loss in weight performance=loss in weight control/loss in weight sample. The results are expressed in base 100. A loss in weight performance for the sample of greater than 100 is regarded as better than the control.

In tables 1 and 2 presented below, the rubber compositions T1 and T2 are two rubber compositions of the prior art, used as reference. The rubber composition T1 corresponds to a composition based on natural rubber, commonly used by those skilled in the art to manufacture an aeroplane tire tread. The rubber composition T2 also contains natural rubber, but with a content of filler and a vulcanization system which differ from those of the rubber composition T1.

The rubber compositions C1 to C5, C15, C18 to C24 contain an EPDM diene elastomer, a reinforcing filler comprising a carbon black and/or a silica at different contents, and a crosslinking system. They differ by the content of EPDM diene elastomer and by the nature and the content of reinforcing filler (carbon black or silica).

A first test, the results of which are presented in table 1 below, has the aim of showing the influence of the content of EPDM diene elastomer in the rubber composition on elongation at break and loss in weight.

TABLE 1

|         | T2  | C1  | C2 | C3 | C4 | C5 |
|---------|-----|-----|----|----|----|----|
| NR (1)  | 100 | —   | 10 | 20 | 40 | 60 |
| EPDM 1 (2) | — | 100 | 90 | 80 | 60 | 40 |

TABLE 1-continued

|  | T2 | C1 | C2 | C3 | C4 | C5 |
|---|---|---|---|---|---|---|
| Carbon black (3) | 30 | 30 | 30 | 30 | 30 | 30 |
| Antioxidant (4) | 1.5 | 1.5 | 1.5 | 1.5 | 1.5 | 1.5 |
| Stearic acid (5) | 2.5 | 2.5 | 2.5 | 2.5 | 2.5 | 2.5 |
| Zinc oxide (6) | 3 | 3 | 3 | 3 | 3 | 3 |
| Accelerator (7) | 2 | 2 | 2 | 2 | 2 | 2 | loss in weight and the elongation at break. Thus, the invention has the advantage of guaranteeing a better loss in weight performance, representative of a better wear resistance during the phase of landing the aeroplane.

A second test, the results of which are presented in table 2 below, has the aim of showing the influence of the nature and the content of reinforcing filler in the rubber composition on the loss in weight.

TABLE 2

|  | T1 | C1 | C15 | C18 | C19 | C20 | C21 | C22 | C23 | C24 |
|---|---|---|---|---|---|---|---|---|---|---|
| NR (1) | 100 | — | — | — | — | — | — | — | — | — |
| EPDM (2) | — | 100 | 100 | 100 | 100 | 100 | 100 | 100 | 100 | 100 |
| Carbon black 1 (3) | 47.5 | 30 | 47.5 | 70 | — | — | — | — | — | — |
| Carbon black 2 (4) | — | — | — | — | 30 | 47.5 | — | — | — | — |
| Carbon black 3 (5) | — | — | — | — | — | — | 30 | 47.5 | — | — |
| Silica (6) | — | — | — | — | — | — | — | — | 30 | 47.5 |
| Silane (7) | — | — | — | — | — | — | — | — | 2.4 | 3.8 |
| Antioxidant (8) | 1.5 | 1.5 | 1.5 | 1.5 | 1.5 | 1.5 | 1.5 | 1.5 | 1.5 | 1.5 |
| Stearic acid (9) | 2.5 | 2.5 | 2.5 | 2.5 | 2.5 | 2.5 | 2.5 | 2.5 | 2.5 | 2.5 |
| Zinc oxide (10) | 3 | 3 | 3 | 3 | 3 | 3 | 3 | 3 | 3 | 3 |
| Accelerator (11) | 0.8 | 2 | 2 | 2 | 2 | 2 | 2 | 2 | 0.8 | 0.8 |
| Sulfur | 1.5 | 0.8 | 0.8 | 0.8 | 0.8 | 0.8 | 0.8 | 0.8 | 1.5 | 1.5 |
| Loss in weight performance (%) | 100 | 195 | 149 | 112 | 184 | 151 | 182 | 153 | 157 | 126 |

(1) Natural rubber
(2) EPDM, Nordel IP 4570 from Dow
(3) Carbon black of N234 grade according to Standard ASTM D-1765
(4) Carbon black of N115 grade according to Standard ASTM D-1765
(5) Carbon black of N550 grade according to Standard ASTM D-1765
(6) Silica of 160 MP grade
(7) Liquid silane, Si69 from Degussa
(8) N-(1,3-Dimethylbutyl)-N-phenyl-para-phenylenediamine, Santoflex 6-PPD from Flexsys
(9) Stearin, Pristerene 4931 from Uniqema
(10) Zinc oxide of industrial grade from Umicore
(11) N-Cyclohexyl-2-benzothiazolesulfenamide, Santocure CBS from Flexsys TABLE 1-continued

|  | T2 | C1 | C2 | C3 | C4 | C5 |
|---|---|---|---|---|---|---|
| Sulfur | 0.8 | 0.8 | 0.8 | 0.8 | 0.8 | 0.8 |
| Elongation at break at 23° C. (%) | 528 | 634 | 664 | 658 | 560 | 465 |
| Loss in weight performance (%) | 100 | 173 | 146 | 132 | 123 | 119 |

(1) Natural rubber
(2) EPDM, Nordel IP 4570 from Dow
(3) Carbon black of N234 grade according to Standard ASTM D-1765
(4) N-(1,3-Dimethylbutyl)-N-phenyl-para-phenylenediamine: Santoflex 6-PPD from Flexsys
(5) Stearin, Pristerene 4931 from Uniqema
(6) Zinc oxide of industrial grade from Umicore
(7) N-Cyclohexyl-2-benzothiazolesulfenamide, Santocure CBS from Flexsys

DETAILED DESCRIPTION OF THE DRAWINGS

The result of this first test shows that the loss in weight performance of the rubber compositions C1 to C5 is always improved relative to that of the reference rubber composition T2. In other words, the losses in weight for the rubber compositions C1 to C5 are always less than that of the rubber composition T2, with the difference in loss in weight performance being able to reach +73% in the case of the rubber composition C1 comprising 100% EPDM. Regarding the elongation at break, it is greater than the reference for the rubber compositions C1 to C4, but becomes less than the reference for the rubber composition C5, in which the EPDM content is less than 50 phr. It is observed that the use of more than 50 phr of EPDM in the rubber composition results in a better compromise in performance between the The result of this second test shows that the loss in weight performance for the rubber compositions according to the invention, C1, C15, C18 to C24 is always improved relative to the reference rubber composition T1. It is also observed that carbon black, especially at a content of less than 70 phr, leads to a better result than silica.

In summary, the rubber compositions based on at least one terpolymer of ethylene, of an α-olefin and of a non-conjugated diene, a reinforcing filler and a crosslinking system, which constitute the middle part of the tread of an aeroplane tire, afford the tire greatly improved performance in terms of resistance to touch wear during landing.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An aeroplane tire comprising a tread having an axial width L, the tread comprising:
   a middle part having an axial width $L_C$ at least equal to 50% and at most equal to 80% of the axial width L of the tread and composed of a middle rubber composition,
   and two lateral parts positioned axially on either side of the middle part, each having an axial width at least equal to 10% and at most equal to 25% of the axial width L of the tread and each composed of a lateral rubber composition, wherein the middle rubber composition comprises at least 50 phr of a first middle part diene elastomer, at most 70 phr of a middle part reinforcing filler and a crosslinking system, which first middle part diene elastomer is a terpolymer of ethylene, of an α-olefin and of a non-conjugated diene and wherein the lateral rubber composition of each lateral part comprises at least 50 phr of a first lateral part diene elastomer, a lateral part reinforcing filler content greater than the middle part reinforcing filler content and a crosslinking system, which first lateral part diene elastomer is a terpolymer of ethylene, of an α-olefin and of a non-conjugated diene, wherein, for at least one of the first middle part and respectively lateral part diene elastomers, the α-olefin is propylene, and wherein the middle part reinforcing filler comprises 100% by weight of a carbon black.

2. The tire according to claim 1, wherein the middle rubber composition comprises at least 60 phr of a first middle part diene elastomer.

3. The tire according to claim 1, wherein at least one lateral rubber composition comprises at least 60 phr of a first lateral part diene elastomer.

4. The tire according to claim 1, wherein for at least one of the first middle part and respectively lateral part diene elastomers, the non-conjugated diene is 5-ethylidene-2-norbornene or dicyclopentadiene.

5. The tire according to claim 1, wherein at least one of the first middle part and respectively lateral part diene elastomers has at least one, of the following characteristics:
the ethylene units represent between 20 and 90%, by weight of the first diene elastomer,
the α-olefin units represent between 10 and 80%, by weight of the first diene elastomer,
the non-conjugated diene units represent between 0.5 and 20% by weight of the first diene elastomer.

6. The tire according to claim 1, wherein at least one of the first middle part and respectively lateral part diene elastomers is the only elastomer of the respectively middle part and lateral part rubber composition.

7. The tire according to claim 1, wherein at least one of the middle or lateral rubber compositions comprises a second middle part or lateral part elastomer.

8. The tire according to claim 7, wherein the second middle part or lateral part elastomer is a highly unsaturated diene elastomer selected from the group consisting of polybutadienes, polyisoprenes, butadiene copolymers, isoprene copolymers and the mixtures of these elastomers.

9. The tire according to claim 1, wherein the reinforcing filler of lateral rubber compositions comprises a carbon black.

10. The tire according to claim 9, wherein the reinforcing filler of lateral rubber compositions comprises 100% by weight of a carbon black.

11. The tire according to claim 1, wherein the reinforcing filler of lateral rubber compositions comprises an inorganic filler.

12. The tire according to claim 1, wherein the middle rubber composition comprises a content of middle part reinforcing filler at most equal to 50 phr.

13. The tire according to claim 1, wherein the middle rubber composition comprises a middle part reinforcing filler content at least equal to 20 phr.

14. The tire according to claim 1, wherein at least one of the middle or lateral rubber compositions comprises from 0 to 20 phr of a liquid plasticizer.

15. The tire according to claim 14, wherein the content of liquid plasticizer of at least one of the middle or lateral rubber compositions is equal to 0.

16. The tire according to claim 1, wherein the two lateral parts, positioned axially on either side of the middle part, have identical axial widths and are composed of identical lateral rubber compositions.

17. The tire according to claim 1, the tire comprising a crown reinforcement radially inside the tread, wherein the tire comprises an interlayer composed of at least one rubber composition, in contact by a radially outer face with at least the middle part of the tread and by a radially inner face with the crown reinforcement.

18. The tire according to claim 17, wherein the interlayer is composed of a rubber composition comprising natural rubber.

19. The tire according to claim 17, wherein the interlayer is composed of a rubber composition comprising an elastomer matrix, which elastomer matrix contains a terpolymeric elastomer of ethylene, of an α-olefin and of a non-conjugated diene and contains at least 10% by weight of diene units.

20. The tire according to claim 17, wherein the interlayer is composed of a rubber composition comprising an elastomer comprising ethylene units and diene units comprising a carbon-carbon double bond, which units are distributed randomly within the elastomer.

21. The tire according to claim 17, wherein the interlayer is composed of an elastomeric laminate comprising, radially from the outside to the inside, n layers Ci, n being an integer greater than or equal to 2 and i being an integer ranging from 1 to n, each composed of a diene rubber composition, the layer C1 comprising a diene elastomer E comprising ethylene units and diene units, the diene units representing more than 10% by weight of the monomer units of the diene elastomer E, the layer Cn comprising from 50 to less than 100 phr of a diene elastomer N having a content by weight of diene units of greater than 50%, the content expressed in phr of diene elastomer N being higher in the layer Cn than in the layer C1, the content expressed in phr of diene elastomer E being higher in the layer C1 than in the layer Cn, the layers Ci, for the values of i ranging from 2 to n−1, where n is greater than 2, comprising a diene elastomer I selected from the group consisting of diene homopolymers and copolymers having more than 10% by weight of diene units.

* * * * *